United States Patent [19]

Sommovigo et al.

[11] Patent Number: 5,544,960

[45] Date of Patent: Aug. 13, 1996

[54] FACETED STIRRING OBJECT FOR SOLID AND LIQUID FOOD SUBSTANCES

[76] Inventors: Christopher V. Sommovigo, 322 W. 25th St., #11, Miami Beach, Fla. 33140; Ray L. Kimber, 2752 S., 1900 West, Ogden, Utah 84401

[21] Appl. No.: 514,021

[22] Filed: Aug. 11, 1995

[51] Int. Cl.$^6$ ............................................. B01F 15/00
[52] U.S. Cl. ............................................. 366/130; 366/342
[58] Field of Search ............................. 366/130, 342, 366/343, 348, 349, 605; 273/146, 58 K, 147, 428; 239/142, 144; 99/348; D21/41; 206/220

[56] References Cited

U.S. PATENT DOCUMENTS

| | | | |
|---|---|---|---|
| D. 198,219 | 5/1964 | Johnson | D21/41 |
| 818,392 | 4/1906 | Parks | 239/142 |
| 1,547,562 | 7/1925 | Byrd | 366/130 X |
| 1,587,580 | 6/1926 | Dutton | 273/146 |
| 2,580,132 | 12/1951 | Seymour | 366/130 |
| 3,087,707 | 4/1963 | Moonan | 366/130 |
| 3,184,118 | 5/1965 | Webster | 239/142 X |
| 4,640,623 | 2/1987 | Tornell | 366/342 |
| 4,641,974 | 2/1987 | Church | 366/130 X |
| 5,236,262 | 8/1993 | Espey | 366/130 |
| 5,352,036 | 10/1994 | Haber et al. | 366/130 |

FOREIGN PATENT DOCUMENTS

| | | | |
|---|---|---|---|
| 1198458 | 12/1985 | Canada | 273/146 |
| 686287 | 7/1930 | France | 273/146 |
| 820991 | 11/1937 | France | 273/146 |
| 2299842 | 9/1976 | France | 366/342 |
| 2400737 | 4/1979 | France | 273/146 |
| 2451761 | 11/1980 | France | 273/146 |
| 2594705 | 8/1987 | France | 273/146 |
| 3743230 | 6/1989 | Germany | 366/342 |
| 1463495 | 3/1989 | U.S.S.R. | 366/342 |
| 16142 | 4/1911 | United Kingdom | 273/58 K |

*Primary Examiner*—Charles E. Cooley
*Attorney, Agent, or Firm*—A. Ray Osburn

[57] ABSTRACT

A generally spherical body having a cluster of facets produced by truncation of the sphere, used for agitating and stirring solid foodstuffs in powdered form with liquid foodstuffs within a container. The removal of material to create the facets unbalances the stirring object, so that it gyrates unpredictably to produce a high degree of mixing turbulence. The facets further collide and slide together to help grind agglomerated lumps of the solid material within the mix. The stirrers have no nooks and crannies for deposit of foodstuffs, and so are easily washed and cleaned for subsequent uses. In one version, the body is of dense homogeneous material such as steel. In another version, the body has a dense object such as of steel embedded within a hard durable plastic outer portion carrying the abovementioned facets.

18 Claims, 3 Drawing Sheets

FACETED STIRRING OBJECT FOR SOLID AND LIQUID FOOD SUBSTANCES

BACKGROUND OF THE INVENTION

1. Field

The field of the invention is agitating stirrers placed along with powdered solid food material and potable liquids into a manually shaken container for mixing.

2. State of the Art

Agitating stirring bodies are commonly used within spray containers having liquid components comprising paint pigments and solvents. Spherical balls about ¼" in diameter are most commonly employed, either singly or in pairs. Typically, the agitators, pigments and solvents are sealed together into the spray cans during manufacturing, the agitators being ultimately disposed of along with the container. In some instances, one or more additional smaller spherical balls are used with the standard sized balls, to more effectively reach and stir into interior, acutely angled corners of the container, such as occur at junctions of bottom and walls. Mixing within these corners tends to limit the size and weight of the spherical objects employed.

U.S. Pat. No. 5,236,262 discloses a circular disc shaped spray can agitator having a thin circumferential edge to probe into the acutely angled corners. The disc joins with a pair of central truncated cones in one embodiment and with a pair of spherical segments in another. The agitator design is essentially balanced about a center of gravity at its geometric center.

U.S. Pat. No. 4,640,623 discloses an essentially spherical agitator ball for a sealed spray container, the sphere however having a number of symmetrically placed ribs outstanding from its surface. The ribs are smoothly rounded, but join the surface of the sphere at sharp junctures. The ribs undoubtedly increase the mixing turbulence over that of smooth spherical balls. This agitator design is essentially balanced, with the center of gravity at the geometric center of the basic sphere. The ribs substantially increase the stirring turbulence produced in the shaken paint spray can. Many sharply defined rib to sphere and rib to rib interfaces create nooks and crannies in which powdered and liquid food would tend to be deposited during food mixing. These may difficult to dislodge and remove during cleaning between uses.

U.S. Pat. No. 4,641,974 discloses a multi-limbed mixing member. A central stem branches into perpendicular members near its center, and carries affixed spherical ball at one end. With many sharp interface angles, the disadvantage of difficulty in cleaning and washing for subsequent uses is present also in this design. The design is geometrically unbalanced, desirably increasing the turbulence when the container is manually shaken. This unbalance results in more random, more unpredictable, mixing motions by the agitator, a true advantage not found in many other designs which are geometrically balanced. The design also has a number of prongs to reach into interior container corners, as well as a number of flat surfaces. These provide opposed grinding surfaces to break up agglomerated lumps if used for food mixing.

Direct adaptation of spray can type agitators to mixing liquid and powdered forms of foodstuffs incurs several serious disadvantages. The need remains for easily washable, reusable agitation devices which can be used singly or in pairs to efficiently mix food in powder form with potable liquids.

BRIEF SUMMARY OF THE INVENTION

With the foregoing in mind, the present invention eliminates or substantially alleviates the disadvantages in prior art sealed container stirring object designs when used for preparing mixtures of powdered solid and liquid food for human consumption. The inventive stirring object in a first embodiment comprises a solid homogeneous sphere, preferably of steel, a portion of which is truncated to form a group of several planar surfaces. The center of gravity of the truncated spherical stirrers is substantially distant from its geometric center, causing it to translate and rotate erratically. The planar truncation surfaces further increase the turbulence. When a pair of the stirring objects are used together, the truncation surfaces collide and slip against each other, breaking up agglomerated globules of the solid powder to eliminate objectionable lumps. Similar glancing, sliding and rebounding collisions occur between the spherical portion of one mixing ball and the truncation facets of the other.

Preferably, each truncation removes sufficient material to create facets with diameters about one half the sphere diameter. Advantageously, one such truncation is made perpendicular to a radius of the sphere, with a group of six provided in the same hemisphere equally spaced therearound, and each disposed at an angle with said radius. The flat facets of this group are preferably placed and angled to intersect in six straight line edges. The straight line intersection edges create further mixing turbulence, increasing the effectiveness of the stirring objects.

The flats provided upon the surface of the basically spherical objects create no nooks into which food particles may become lodged during use of the mixing spheres, facilitating cleaning and washing for reuse. Being intended for such reuse, the stirring objects are preferably relatively large to render loss more difficult. The attendant greater weight and mass also increases the efficiency of the mixing.

According to another embodiment, the stirring object comprises a weighty steel sphere enclosed within a faceted sphere of moldable hard, non-brittle plastic. The steel sphere is preferably located off the geometric center of the plastic, assuring erratic movements potentially greater than those of the homogeneous version.

It is therefore the principal object of the invention to provide reusable, easily cleaned, mixing objects for food preparation requiring the mixing of liquid and solid food substances.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
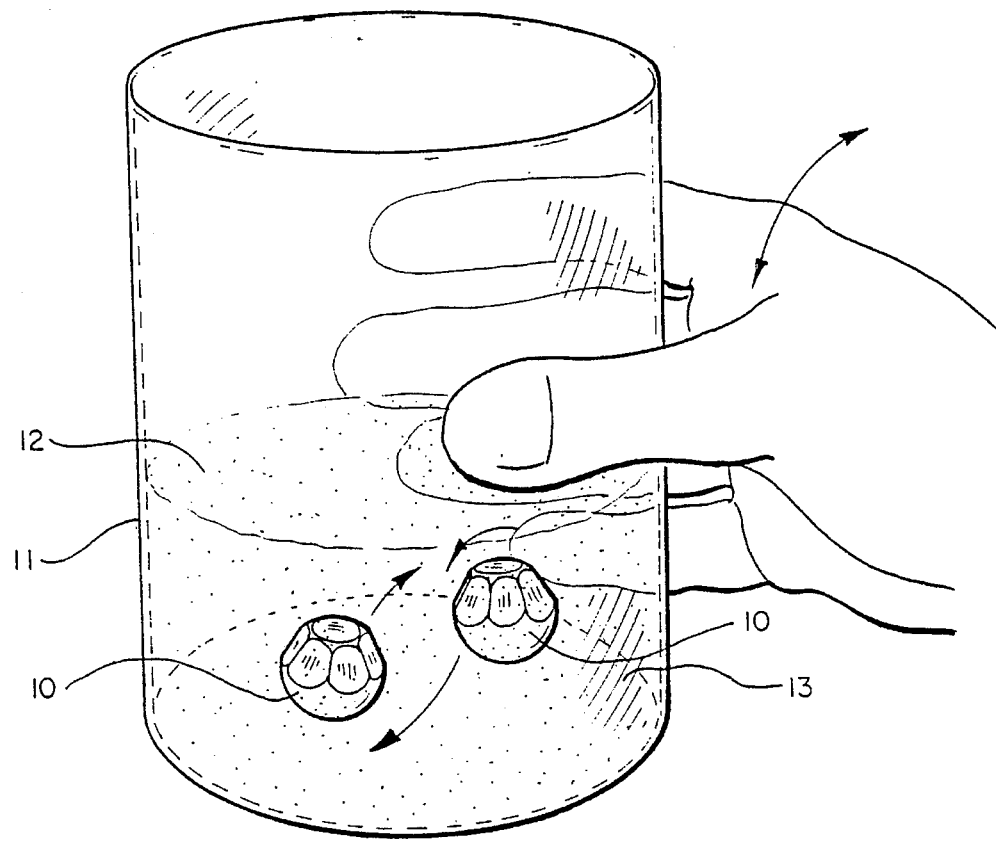
FIG. 1 is a substantially actual scale representation of a pair of stirring agitators in accordance with the invention being manually shaken within a container along with a mixture of solid and liquid foodstuffs, FIG. 2 an enlarged perspective view of a stirring agitator in accordance with the invention, showing the generally spherical body and the clustered group of facets, FIG. 3, drawn to the scale of FIG. 2, is a view taken in the direction of the plane of the central facet of the group, FIG. 4 a view perpendicular to the plane of the center facet of the cluster thereof, drawn to the scale of FIG. 2, FIG. 5 a diagrammatic comparison of hypothetical positions of a stirring agitator in accordance with the invention when shaken within a container with liquid therein, in comparison with the less tortuous path of a hypothetical sphere of the same size being entirely smooth over its entire surface, all drawn to a hypothetical actual scale, FIG. 6 a representation of a pair of the stirring agitators of the invention colliding together to crush an agglomerated lump of solid foodstuffs between facets of a pair of the stirrers, drawn to the scale of FIG. 2, FIG. 7 a representation of an agglomerated lump of solid foodstuffs being cut by the intersection edge of a pair of facets of one agitator acting against a facet of a second, paired, agitator, drawn to the scale of FIG. 2, FIG. 8 a representation of another preferred embodiment in accordance with the invention comprising a spherical surface with a faceted portion, and having an interior metallic ball, partially sectioned to show the interior construction thereof, drawn to the scale of FIG. 2, FIG. 9 a cross sectional view of the unfaceted hemispherical portion of the embodiment of FIG. 8, showing the interior steel ball in place within a well, drawn to the scale of FIG. 8, and FIG. 10 a representation of the unfaceted hemisphere and steel ball of FIG. 9 placed into a split mold, for injection of plastic to form the faceted hemisphere of the invention, drawn to the scale of FIG. 9.

In FIG. 1, a pair of homogeneous solid stirring agitators 10 in accordance with the invention are shown being manually shaken within a mixing container 11. A powdered food substance 12, such as a reducing diet formulation, is shown being emulsified with a liquid food component 13 such as water or skimmed milk. The pair of agitators 10 rotate, wobble and rebound from each other and from the walls of the container, providing violent effective emulsifying turbulence.

Figure 2:
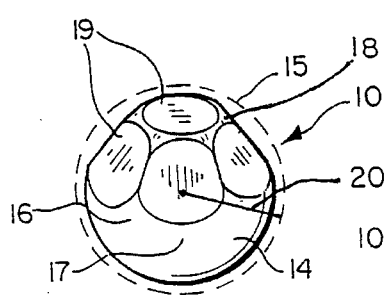
Figure 3:
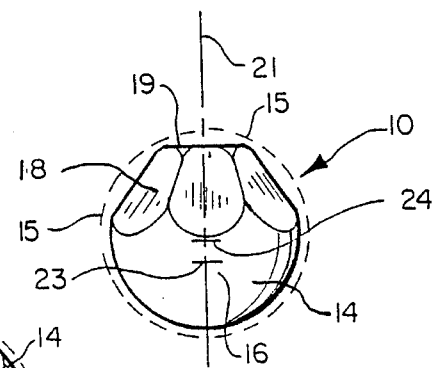
Figure 4:
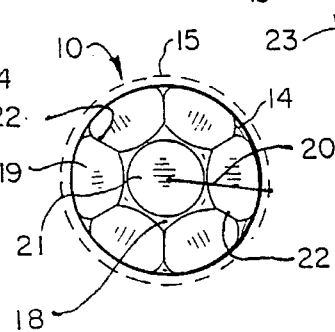

Each agitator 10 of FIGS. 1–7 has a body 14 generally in the form of a spherical ball, as indicated in FIGS. 2–4, and is shaped to fit within a spherical envelope 15 indicated in dashed lines. Body 14 comprises an approximately hemispherical portion 16, the surface 17 of which everywhere conforms closely to spherical envelope 15. Remaining portion 18 of body 14 carries a multiplicity of planar facets 19, each created by truncation of spherical body 14. In the illustrated embodiments, the facets 19 are generally circular, each corresponding to a truncation perpendicular to a radius of spherical envelope 15 and its spherical body 14. The illustrated diameter of each facet is approximately equal to the radius 20 of body 14. Six facets 19 are evenly spaced about agitator portion 18. One facet 19 is produced by truncation of body 14 perpendicular to its axis of symmetry 21. The evenly spaced circular facets 19 about body 14 overlap to create angled intersection corners 22.

Body 14 of agitator 10 of FIGS. 1–7 is solid and homogeneous, so that its center of gravity 23 is displaced from geometric center 24 of body 14 along axis of symmetry 21 to lie within hemispherical portion 16. Because the center of gravity 23 is geometrically off center, agitator 10 tends to swing and spin more erratically and unpredictably when shaken within a body of liquid than does a smooth spherical object. In addition to the unbalanced mass distribution of body 14, the unbalanced forces from the unbalanced surface shape contributes to the erratic nature of the motion within the liquid.

Figure 5:
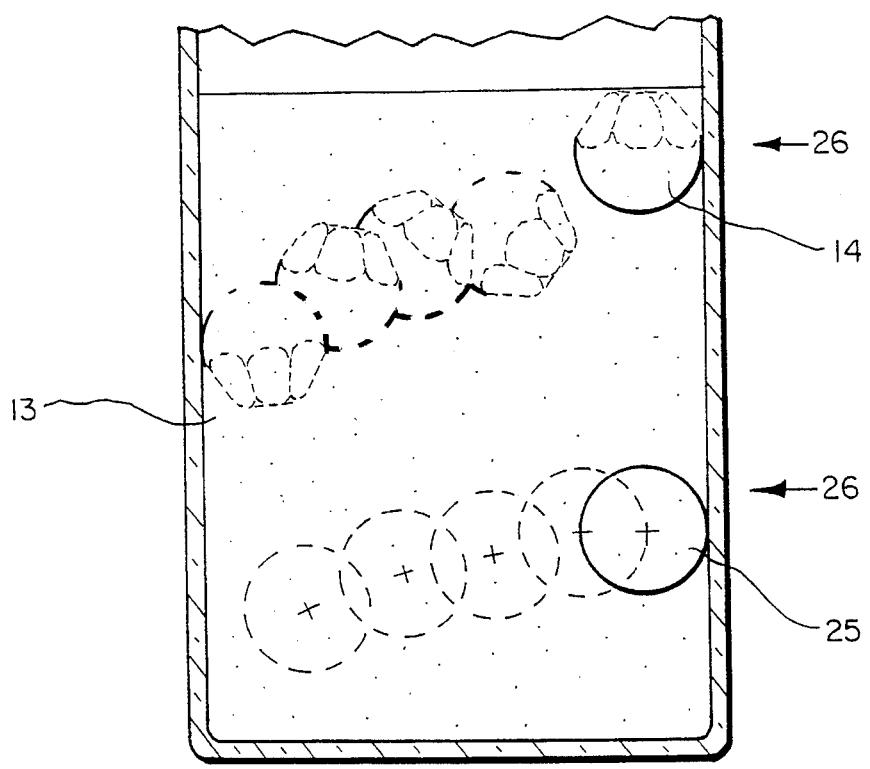

While it is impractical or impossible to fully define translational and rotational states of motion of agitator 10, a comparison of a simplified hypothetical trajectory of agitator 10 with that of a completely smooth spherical counterpart 25 is indicated in FIG. 5. Both agitators are for purposes of the comparison assumed to be given common horizontal starting pushes 26 through the liquid, without initial spin. The perfectly spherical ball 23 tends to travel in a straight line altered only by gravity. The path of the faceted agitator 10 is by comparison more erratic. Unequal shearing forces on faceted and smooth portions 18 and 16 respectfully combine with the unbalancing effect of displaced center of gravity 23 to cause agitator 10 to loop and spin abruptly and unpredictably. This improves the mixing considerably.

Figure 6:
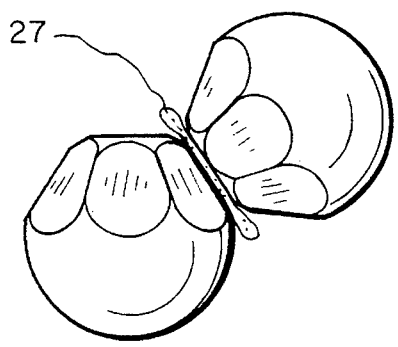
Figure 7:
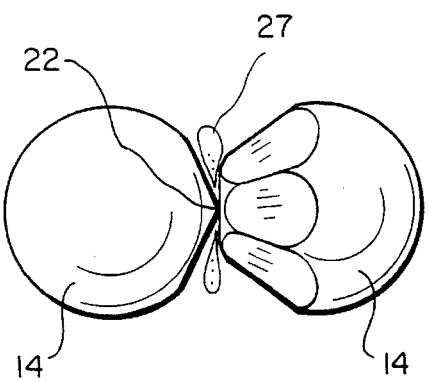

Agitators 10 are preferably employed in pairs rather than singly. This increases the mixing efficiency by doubling that of a single agitator 10 and also by providing glancing trajectories as the pair of bodies 14 collide. Each agitator 10 gyrates more violently, creating more turbulence, so that the mixing is improved not merely additively but also synergistically. The paired use causes sliding contact between facets 19, crushing trapped agglomerations 27 of solid particles. Facet intersection corners 23 of each agitator strike and slash against the flat surfaces of the other. (FIGS. 6 and 7)

Although body 14 of agitator 10 has no thin projections or edges to reach directly into interior corners of the mixing container 11, none of the corners collect any unmixed solids. All solids are effectively emulsified by the very high mixing turbulence.

The bodies 14 of the agitators 10 are free of ribs or other projections, the surfaces of which in many existing agitator designs join with the sphere surfaces or other surfaces of the agitator to create included corners. These corners tend to collect undissolved or unmixed solid food particles, creating difficulty in washing the agitators for reuse. Agitators 10 are free of all such nooks and crannies, and are correspondingly easily cleaned.

Various sizes of the agitators 10 may be selected and built. However, a substantial size is advantageous to prevent loss of the agitators during washing and storing between repeated uses. A spherical diameter in the neighborhood of ¾" has proven to be practical, providing substantial mass for efficient mixing turbulence and being large enough for loss to be unlikely between uses.

Agitator 10 is preferably of a homogeneous composition throughout and is preferably of a metallic material, and steel is the preferred metal. Agitators of similar shape produced in plastic are within the spirit of the invention; however, the resulting decrease in weight and mass, along with the tendency of such agitators to float, impairs their effectiveness.

Figure 8:
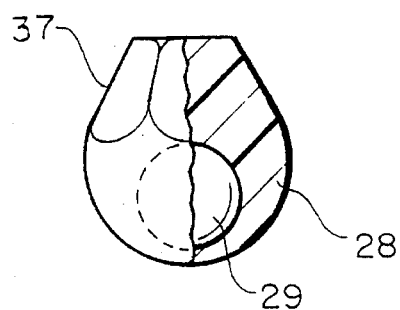
Figure 9:
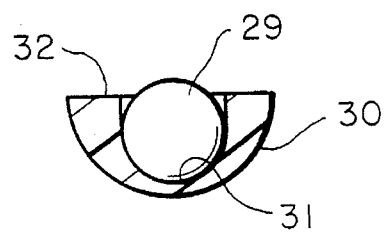
Figure 10:
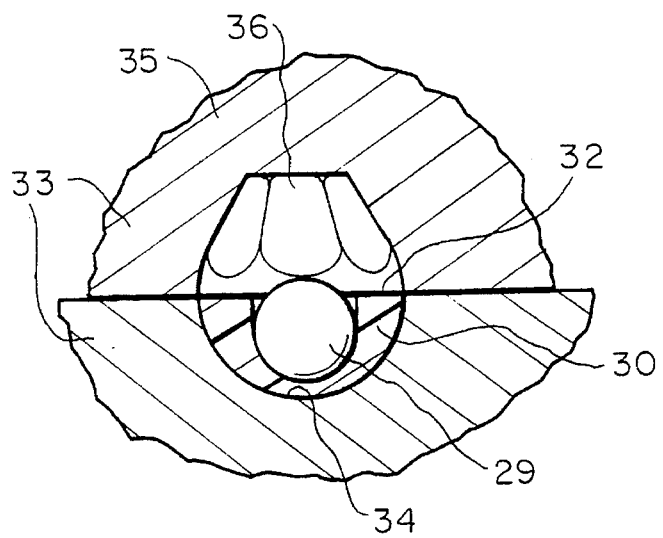

The homogeneous steel mixing objects 10 are however somewhat expensive to fabricate. Another embodiment, illustrated in FIGS. 8–10 retains the exterior faceted shape and remains desirably heavy. This embodiment comprises a faceted exterior portion 28 of hard durable plastic, such as Delrin®, encasing an interior member 29 of heavy material, preferably a steel sphere, although other shapes and materials could be used. Iron is an acceptable substitute material, and lighter metals and alloys including brass and aluminum may be acceptable, although undesirably less dense. Steel balls, such as ball bearings, are probably most readily available and economical.

The interior ball 29 is completely restrained against movement within the stirring object, confined over its entire surface by the encasing plastic. Ball 29 is placed to be substantially eccentric to the faceted plastic sphere 28, so that the center of gravity of the stirring object 10, determined principally by the mass of the steel ball, is well removed from the geometric center of the stirring object. This tends to enhance the erratic nature of its movement even beyond that of the homogeneous embodiment, as described hereinabove.

The plastic-steel embodiment of stirring object 10 may be constructed by first molding an unfaceted plastic hemisphere 30 including a well 31, into which is placed the interior spherical steel ball 29. (FIG. 9) Well 31 is sufficiently deep to place the center of ball 29 substantially lower than upper plane 32 of the unfaceted plastic hemisphere.

The ball and the first molding are then placed within a split mold 33 carrying a hemispherical cavity 34 which accepts the previously molded, unfaceted hemisphere in cured or partially cured condition. Upper mold member 35 carries a cavity 36 shaped to provide faceted plastic hemisphere 37 to complete a non-homogeneous embodiment of stirring object 10. Uncured plastic injected into assembled split mold 33 melds with cured plastic of hemisphere 30 and completely encases ball 29.

The invention may be embodied in still other specific forms without departing from the spirit or essential characteristics thereof. The present embodiments and methods are, therefore, to be considered as illustrative and not restrictive, the scope of the invention being indicated by the appended claims rather than by the foregoing description, and all changes that come within the meaning and range of equivalency of the claims are, therefore, intended to be embraced therein.

What is claimed and desired to be secured by United States Letters Patent is:

1. A stirring and agitating member for placement along with liquid and finely divided solid foodstuffs into a container to be manually shaken to thoroughly mix said foodstuffs together, said member comprising:

a body contained within a spherical envelope, said body having a portion with an unaltered spherical hemispherical outer surface and a portion the outer surface of which comprises at least one planar facet; wherein the portion comprising said at least one planar facet is carried by a hemisphere of the body contained within the spherical envelope.

2. The stirring and agitating member of claim 1, wherein: the body contained within the spherical envelope is truncated to form the at least one planar facet.

3. The stirring and agitating member of claim 2, wherein the hemisphere of the body contained within the spherical envelope carrying the at least one planar facet comprises:

a first planar facet perpendicular to and centered about an associated radius of the spherical envelope; and six planar facets equally spaced about said hemisphere, the planes thereof being equally angled with respect to said associated radius.

4. The stirring and agitating member of claim 3, wherein: the six equally spaced facets overlap to form six corners of intersection.

5. The stirring and agitating member of claim 3, wherein: the planar facets are of equal diameter.

6. The stirring and agitating member of claim 5, wherein: the diameter of each planar facet is equal to the radius of the spherical envelope.

7. The stirring and agitating member of claim 2, wherein: the diameter of the spherical envelope is at least ⅜".

8. The stirring and agitating member of claim 1, wherein: the diameter of the spherical envelope is at least ⅜".

9. The stirring and agitating member of claim 1, wherein: the body is solid and homogeneous.

10. The stirring and agitating member of claim 9, wherein: the body is of steel.

11. The stirring and agitating member of claim 1, wherein: the body is of steel.

12. The stirring and agitating member of claim 1, wherein the body contained within the spherical envelope comprises:

at least one internal object secured entirely and immovably within an external portion of hard durable plastic, the internal object being of substantially greater density than said plastic.

13. The stirring and agitating member of claim 12, wherein:

the at least one internal object is a steel sphere placed within the external portion eccentrically of the center of mass of the external portion.

14. The stirring and agitating member of claim 13, wherein the external portion of the body comprises:

said at least one planar facet being perpendicular to an associated radius of the spherical envelope; and six planar facets equally spaced about the hemisphere of the body contained within the spherical envelope carrying the at least one planar facet and oriented equally angled with respect to said associated radius.

15. The stirring and agitating member of claim 14, wherein:

the at least one facet and the six equally spaced facets are carried by a hemisphere of the external portion of the body.

16. The stirring and agitating member of claim 15, wherein:

the six equally spaced facets overlap to form six corners of intersection.

17. A method for mixing finely divided solid and liquid foodstuffs, comprising the steps:

placing said foodstuffs together into a container;

placing at least one stirring and agitating member into the container, said at least one member comprising a body contained within a spherical envelope, said body having a portion with an unaltered hemispherical outer surface and a portion the outer surface of which comprises at least one planar facet; and manually shaking said container until the foodstuffs are thoroughly mixed.

18. The method of claim 17, wherein:

at least two of the stirring and agitating members are placed together into the container.

* * * * *